United States Patent
Yokoyama et al.

(10) Patent No.: US 7,298,429 B2
(45) Date of Patent: Nov. 20, 2007

(54) PHOTOINDUCED SWITCHING LIQUID CRYSTAL DEVICE UTILIZING PHOTOISOMERIZATION

(75) Inventors: Hiroshi Yokoyama, Ibaraki (JP); Jun Yamamoto, Tokyo (JP); Lachezar Komitov, Gothenburg (SE)

(73) Assignee: Japan Science and Technology Agency, Kawaguchi-shi (JP)

( * ) Notice: Subject to any disclaimer, the term of this patent is extended or adjusted under 35 U.S.C. 154(b) by 559 days.

(21) Appl. No.: 10/473,598

(22) PCT Filed: Oct. 29, 2001

(86) PCT No.: PCT/JP01/09465

§ 371 (c)(1),
(2), (4) Date: Oct. 10, 2003

(87) PCT Pub. No.: WO02/084387

PCT Pub. Date: Oct. 24, 2002

(65) Prior Publication Data

US 2004/0131797 A1    Jul. 8, 2004

(30) Foreign Application Priority Data

Apr. 10, 2001    (JP) .............................. 2001-111049

(51) Int. Cl.
*G02F 1/135* (2006.01)
*G02F 1/1337* (2006.01)

(52) U.S. Cl. ........................................ 349/24; 349/125
(58) Field of Classification Search .................. 349/24, 349/123, 125; 428/1.1
See application file for complete search history.

(56) References Cited

U.S. PATENT DOCUMENTS

| | | | | |
|---|---|---|---|---|
| 4,974,941 A | * | 12/1990 | Gibbons et al. | 349/24 |
| 5,928,733 A | * | 7/1999 | Yoneya et al. | 428/1.3 |
| 6,525,879 B1 | * | 2/2003 | Kawano et al. | 359/559 |
| 6,602,563 B2 | * | 8/2003 | Kobayashi et al. | 428/1.3 |

FOREIGN PATENT DOCUMENTS

| | | |
|---|---|---|
| JP | 54-43759 | 4/1979 |
| JP | 4-366834 | 12/1992 |
| JP | 5-19260 | 1/1993 |
| JP | 8-15661 | 1/1996 |
| JP | 9-296174 | 11/1997 |

* cited by examiner

*Primary Examiner*—Andrew Schechter
*Assistant Examiner*—Nathanael R Briggs
(74) *Attorney, Agent, or Firm*—Oblon, Spivak, McClelland, Maier & Neustadt, P.C.

(57) ABSTRACT

A fast and highly practical photoinduced switching liquid crystal device is provided.

In the photoinduced switching liquid crystal device, in-plane switching of an optical anisotropic axis of dichroic nematic liquid crystal is performed at a high speed by light.

6 Claims, 4 Drawing Sheets

(a)

(b)

(a)

(b)

UV light

PHOTOINDUCED SWITCHING LIQUID CRYSTAL DEVICE UTILIZING PHOTOISOMERIZATION

TECHNICAL FIELD

The present invention relates to photoinduced switching liquid crystal devices.

BACKGROUND ART

Relevant art of the present invention is disclosed in the following literatures.

(1) A. S. Zolotko, V. F. Kitaeva, N. Kroo, N. N. Sobolev, L. Csillag, JETP.Lett., 32, 158 (1980).

(2) B. Y. Zel'dovich, N. V. Tabiryan, Sov. J. Quantum Electron., 10, 440 (1980).

(3) T. Ikeda, T. Sasaki, K. Ichimura, Nature, 361, 428 (1993).

(4) L. Komitov, K. Ichimura, A. Strigazzi, Liq. Cryst., 27, 51 (2000).

(5) L. Komitov, C. Ruslim, Y. Matsuzawa, K. Ichimura, Liq. Cryst., 27, 1011 (2000).

(6) L. Komitov, K. Ichimura, Mol. Cryst. Liq. Cryst., in press (7) L. Komitov, O. Tsusumi, C. Ruslim, T. Ikeda, K. Ichimura, K. Yoshino, submitted to J. Appl. Phys.

(8) E. Santamato, Y. R. Shen, "Liquid Crystals for Nonlinear Optical Studies" in the book "Handbook of Liquid Crystal Research" Oxford University Press, New York, 1997.

(9) C. Ruslim, L. Komitov, Y. Matsuzawa, K. Ichimura, Jap. J. Appl. Phys., 39, L104 (2000).

(10) L. Komitov, J. Yamamoto, H. Yokoyama, J. Appl. Phys., 89, 7730 (2001).

(11) P. Jägemalm, G. Barbero, L. Komitov, A. K. Zvezdin, Phys. Rev. E, 58, 5982 (1998).

(12) P. Jägemalm, G. Barbero, L. Komitov, A. Strigazzi, Phys. Lett. A235, 621 (1997).

(13) M. Monkade, M. Boix, G. Durand, Europhys. Lett., 5, 697 (1988).

(14) B. Jerome, M. Boix, P. Pieranski, Europhys. Lett., 5, 693 (1988).

(15) P. Jägemalm, L. Komitov, Liq. Cryst., 23, 1 (1997).

(16) M. Nobili, PhD Thesis, 1992.

(17) M. Nobili, G. Durand, Europhys, Lett., 25, 527 (1994).

(18) P. Jägemalm, D. S. Hermann, L. Komitov, F. Simoni, Liq. Cryst, 24, 335 (1998).

(19) D. S. Hermann, P. Rudquist, K. Ichimura, K. Kudo, L. Komitov, S. T. Lagerwall, Phys. Rev. E, 55, 2857 (1997).

(20) Y. Matsuzawa, C. Ruslim. L. Komitov, K. Ichimura, Mol. Cryst. Liq. Cryst. in press.

Liquid crystal is a very highly anisotropic material and has optical properties which can be very easily changed in accordance with various external factors such as electric and magnetic fields, mechanical flow, temperature, and light. In addition to the electro-optic effects, optically induced reorientation of the alignment of liquid crystal has drawn strong interest due to its potential for different device implementations in photonics. In general, there are two possible methods for affecting the alignment of liquid crystal by light so as to change light transmittance thereof. One of such methods is a way to use direct interaction between light and liquid crystal molecules, as is the photoexcited Fredericks transition, and the other method is an indirect photoexcitation method in which surface or bulk liquid crystal properties are changed by light.

The photoexcited Fredericks transition is caused by giant optical nonlinearity of liquid crystal and has drawn strong interest for these 20 years. In this case, when light imposes a direct and rotational torque on liquid crystal molecules, reorientation of the alignment thereof occurs in a predetermined direction. The direction in which the liquid crystal is aligned depends on various experimental conditions such as an alignment direction of liquid crystal before illumination, the thickness of a cell, and light intensity.

In recent years, photoinduced reorientation of the alignment of azobenzene liquid crystal was reported which is caused by the change in bulk or surface properties thereof resulting from photoexcitation.

A subject which is most closely related to the study carried out by the inventors of the present invention is a photoinduced anchoring transition of dichroic azobenzene liquid crystal that occurs resulting from the modulation of macroscopic surface anchoring conditions induced by the change in molecular shape during a photoisomerization process. That is, when the concentration of the azobenzene molecules adheres to the solid surface exceeds a certain level, the macroscopic alignment of liquid crystal is changed from the planar alignment to the homeotropic alignment. That is, as reported by the inventors of the present invention, after being transformed from trans-isomers to cis-isomers by photoisomerization, the azobenzene molecules are more likely to adhere selectively to a solid surface, and as a result, the anchoring conditions for the liquid crystal are changed. The reason for this is understood that since the molecular shape and the direction of molecular electron dipole moment of the trans-isomer are significantly different from those of the cis-isomer, a large polarity resulting from a bent molecular shape of the cis-isomer enhances the adsorption properties of the azobenzene molecules to the solid surface.

However, the modulation (photoregulation of the anchoring) of the surface anchoring conditions caused by photoexcitation is a continuous process, and hence it is not appropriate that this phenomenon itself is used as the principle of a light switching device. In fact, even before the transformation from the planar alignment to the homeotropic alignment caused by photoexcitation is observed, the continuous change in anchoring intensity, which depends on the light exposure time, can be clearly grasped by the change in voltage when the threshold voltage of the electric field induced Fredericks transformation is measured.

DISCLOSURE OF INVENTION

Recently, the inventors of the present invention reported the coupling between anchoring interaction in a azimuthal angle direction and that in a polar angle direction, which is shown when the direction of alignment of liquid crystal with respect to a substrate is represented by a azimuthal angle $\phi$ and a polar angle $\theta$. In particular, in the case of the alignment of nematic liquid crystal by a $SiO_x$ thin film, it was found that biaxial degeneracy of the alignment occurs. That is, due to the presence of the coupling of two anchoring forces, quasi-in-plane (in-plane) switching with respect to the change in direction of the alignment of liquid crystal can be performed by the balance between the azimuth anchoring and the polar anchoring.

According to the present invention, a twofold degenerate (two-state degeneracy) in-plane switching phenomenon, which is caused by the competition of the anchoring forces on the SiO$_x$ substrate, is combined with an anchoring transition phenomenon, which is caused by conventional photoisomerization of azobenzene liquid crystal molecules, thereby realizing photoregulated fast in-plane switching. According to the present invention, by photoexcitation, the angle of an anisotropic axis can be rotated by approximately 90°, the switching time can be one second or less, and as a result, a significantly fast switching can be realized as compared to that performed by a conventional photoexcited in-plane switching control method.

Accordingly, in consideration of the situation described above, an object of the present invention is to provide a fast and highly practical photoinduced switching liquid crystal device.

To the end described above, the present invention provides:

[1] a photoinduced switching liquid crystal device which is characterized in that fast in-plane photoinduced switching of an optical anisotropic axis of dichroic nematic liquid crystal is performed by light.

[2] In the photoinduced switching liquid crystal device according to the above [1], ultraviolet light is used as the light described above so that azobenzene liquid crystal molecules are transformed from trans-isomers to cis-isomers.

[3] In the photoinduced switching liquid crystal device according to the above [1], the structure is formed in which the liquid crystal described above is enclosed in a cell formed of substrates provided with obliquely deposited silicon oxide (SiO$_x$) functioning as an alignment layer, and the switching is performed based on the photoinduced anchoring transition.

[4] In the photoinduced switching liquid crystal device according to the above [1], [2], or [3], the change in the optical anisotropic axis caused by photoinduction can be increased to approximately 80 to 90°.

[5] In the photoinduced switching liquid crystal device according to the above [1], [2], or [3], the switching time described above is fast on the second time scale.

BEST MODE FOR CARRYING OUT THE INVENTION

Hereinafter, embodiments of the present invention will be described in detail.

First, photoinduced in-plane (in-plane) switching of photodichroic nematic liquid crystal will be described.

In this embodiment, fast in-plane switching of photodichroic nematic liquid crystal by photoexcitation will be described.

In the alignment control of nematic liquid crystal by a obliquely deposited SiO$_x$ layer, degenerated biaxial anchoring is achieved. The process of this in-plane switching occurs by competition between two phenomena, that is, the photoisomerization which modulates the anchoring conditions and the coupling of anchoring forces present in a polar angle direction and in a azimuthal angle direction. In the photoinduced in-plane reorientation of the alignment, a rotation of an anisotropic axis of approximately 90° was found. Together with the model of the photoinduced in-plane switching, some of new effects will be briefly described.

In the present invention, a general sandwich type liquid crystal cell was used. This cell was composed of two glass substrates each having an ITO electrode coated with an obliquely deposited SiO$_x$ thin film, thereby obtaining twofold degeneracy of the alignment of nematic liquid crystal. The deposition conditions of a SiO$_x$ thin film are significantly important for realizing the twofold degenerate anchoring condition described above [for more detailed information, refer above-mentioned literatures (13) to (15)]. The cell gap was set to 6 μm (obtained by SiO$_2$ spacers which were deposited by a general method), and the liquid crystal material was introduced into the cell in the isotropic phase.

Figure 5:
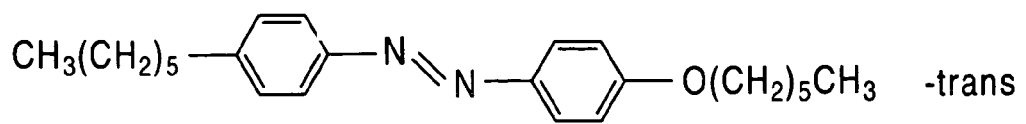
FIG. 5 is a schematic view of trans-cis photoisomerization of a 4-hexyloxy-(4'-hexyl) azobenzene molecule according to the present invention.
Figure 5:
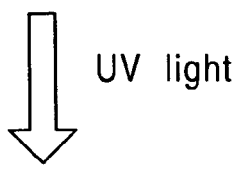
Figure 5:
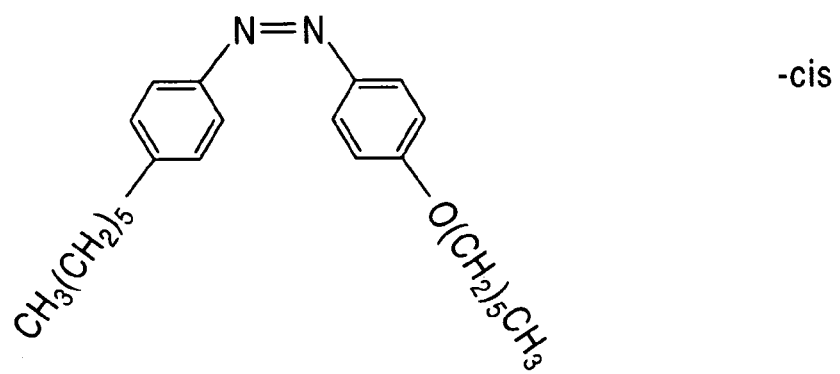

The dichroic nematic liquid crystal used in this embodiment was 4-hexyloxy-(4'-hexyl)azobenzene having the following molecular structure (FIG. 5).

Due to the twofold degenerate anchoring condition, four different types of domain structures could be found, that is, two twisted structures having different senses from each other and two uniformly tilted structures in which the tilt directions of molecules are present symmetrically on both sides of the deposited SiO$_x$ plane. However, when special treatment is performed, a sample having a monodomain structure can be prepared which is one of the uniformly tilted structures. The photoexcited reorientation of the alignment of the liquid crystal was measured using an experimental device described below.

Figure 1:
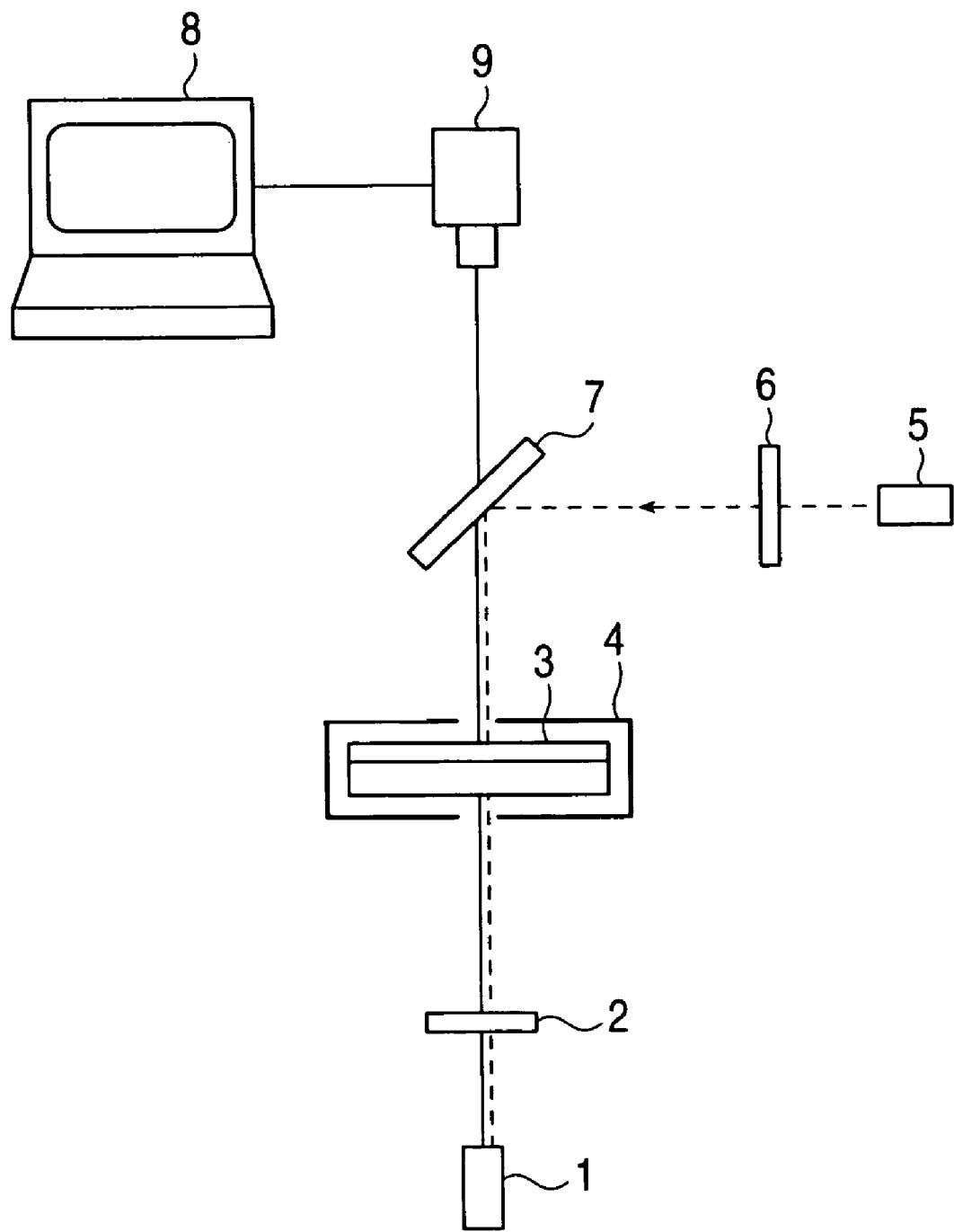
FIG. 1 is a schematic view of an experimental device for a photoinduced switching liquid crystal device of an example according to the present invention.

FIG. 1 is a schematic view of an experimental device for a photoinduced switching liquid crystal device of an example according to the present invention.

In this figure, as an excitation light source, an Hg lamp 5 is used. The wavelength of excitation light is selected by using a optical filter 6. By illumination of the excitation light, photoisomerization occurs in dichroic nematic liquid crystal. Light being emitted from a white light source of a halogen lamp 1 and passing through an optical filter 2, which has a wavelength λ=nm (λ>580 nm), is used for observation of the alignment of the liquid crystal.

This experimental device described above is formed of a fluorescent/polarizing microscope (Nikon, Eclipse800), a highly advanced CCD (charge coupled device) camera 9 connected to a computer 8, a software for image processing, a hot stage 4 for temperature control, and two light sources 1 and 5 for the observation of the liquid crystal and for the photoisomerization, respectively. The sample is placed in the hot stage 4 for temperature control, which is mounted on a rotation stage of the polarizing microscope. The alignment of the liquid crystal in the cell was inspected between polarizers orthogonally intersecting with each other by using light passing through the optical filter 2 which cut a wavelength of 580 nm or less. In addition, reference numeral 7 indicates a dichroic mirror.

The cut-off wavelength of the filter 2 used for the light source for observation was selected so as to avoid the photoisomerization of dichromatic nematic liquid crystal 3 during observation. The light source needed for promoting the photoisomerization process was generated by the Hg lamp 5. The excitation of the sample was performed by a wavelength λ of 510 to 560 nm. The alignment direction of the liquid crystal caused by photoorientaion, that is, the anisotropic axis of the sample, was measured as the position at which the transmitting light between the two polarizers orthogonally intersecting each other was the minimum.

Figure 2:
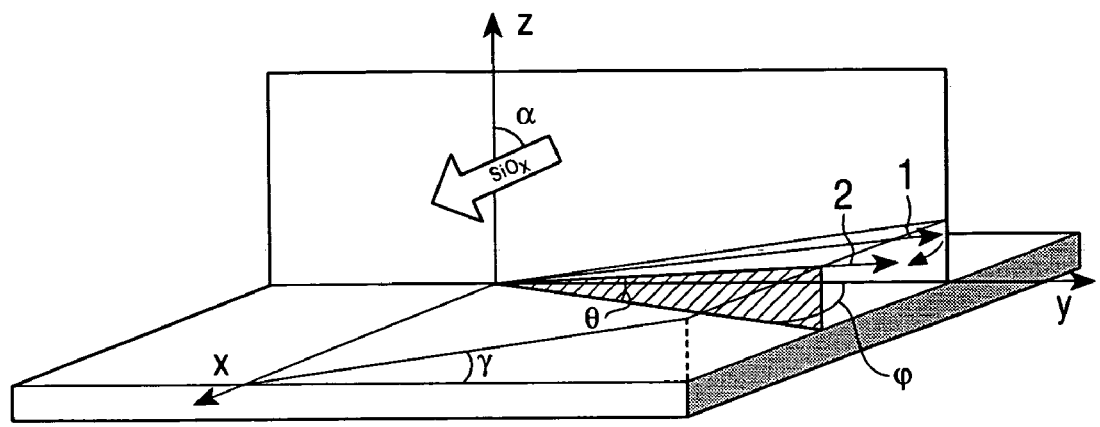
FIG. 2 is a view schematically showing the region of a twofold degenerate anchoring according to the present invention.
Figure 2:
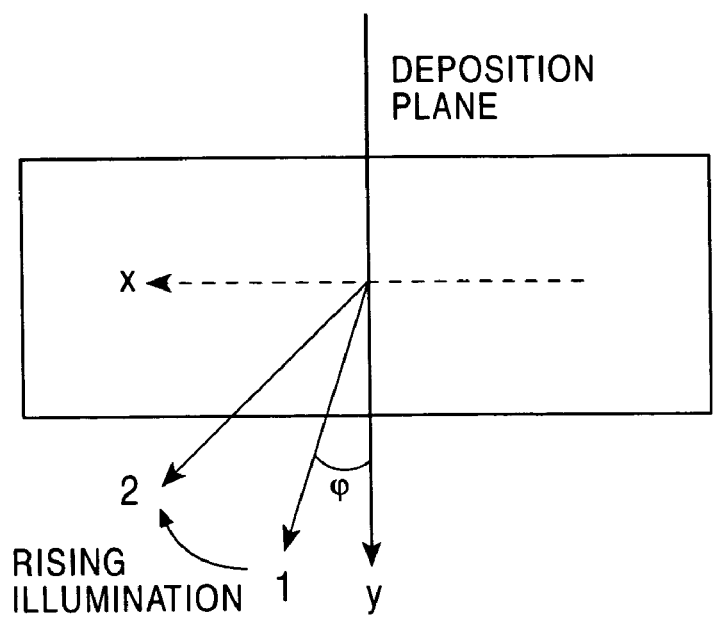

FIG. 2 is a view schematically showing the region of the twofold degenerate anchoring according to the present invention.

This figure is a schematic view of nematic liquid crystal in the twofold degenerate anchoring condition which is induced by the obliquely deposited $SiO_x$ at an angle α (in order to avoid complication, only one of two possible alignment directions of the liquid crystal is shown in the figure. The other one is located symmetrically on the other side with respect to the deposition plane YZ). The alignment direction of the liquid crystal, that is, the direction of the optical anisotropic axis, is determined by φ and θ, that is, the azimuthal angle and the polar angle, respectively.

FIG. 2(a) shows the temperature-induced change of the optical anisotropic axis, in which positions 1 and 2 indicate the alignment directions of the liquid crystal at temperatures $T_1$ and $T_2$, respectively, and $T_1 < T_2$ is satisfied. Along the trajectory on a plane defined by equations (1) and (2), which is perpendicular to the YZ plane and which forms an angel γ with an XY plane, the alignment direction of the liquid crystal moves away from the deposition plane YZ. FIG. 2(b) shows the photoinduced change of the optical anisotropic axis, and as is the case shown in FIG. 2(a), the optical axis of the sample moves from the deposition plane to the X axis. (For more detailed information, refer above-mentioned literatures (15) to (17).)

The region of the twofold degenerate anchoring is defined between two different monostable alignment states, that is, planar and tilted alignment states. The directions of the planar alignment and the tilted alignment of the liquid crystal are along the X axis direction and on the YZ plane, respectively. In the region of the twofold degeneracy, the alignment direction of the liquid crystal splits into two directions that are symmetrically located on both sides of the deposition plane. As it has been theoretically predicted and experimentally confirmed, there should exist a coupling between anchoring in the polar angle direction and that in the azimuthal angle direction, each angles being defined by θ and φ, respectively. In the case of the temperature-induced alignment transition, the coupling is represented by the following equation.

$$\sin\varphi \tan\theta = \sqrt{\frac{1-(r+t/S+\rho+\tau/S)}{r+t/S}} \quad (1)$$

$$\cos\varphi \tan\theta = \tan\gamma \quad (2)$$

In the above equation, r, t, ρ, and τ are the parameters, whose values can be determined from the best fit to the experimental results, and S is the scalar order parameter. From equation (1), temperature dependence of the alignment direction of the liquid crystal, which is determined by φ and θ, can be obtained. In other words, in the case of the temperature-induced alignment transition, because of the coupling between φ and θ, the alignment direction of the liquid crystal moves along the trajectory on the plane which is perpendicular to the YZ plane and which forms an angle γ of approximately 20° with the XY plane. When the sample is observed with crossed nicols before being illuminated with light, the optical anisotropic axis, that is, the alignment direction of the liquid crystal, is located at a position deviated by an angle φ of approximately 10° from the deposition plane YZ. It is understood that when the temperature is increased, the optical anisotropic axis moves from the deposition plane toward the X axis. FIG. 2(a) schematically shows the directions of the optical anisotropic axes at different temperatures $T_1$ and $T_2$, and at a temperature near a clearing point $T_{N1}$ of 70° C., it is understood that the optical anisotropic axis is along the X axis.

Figure 3:
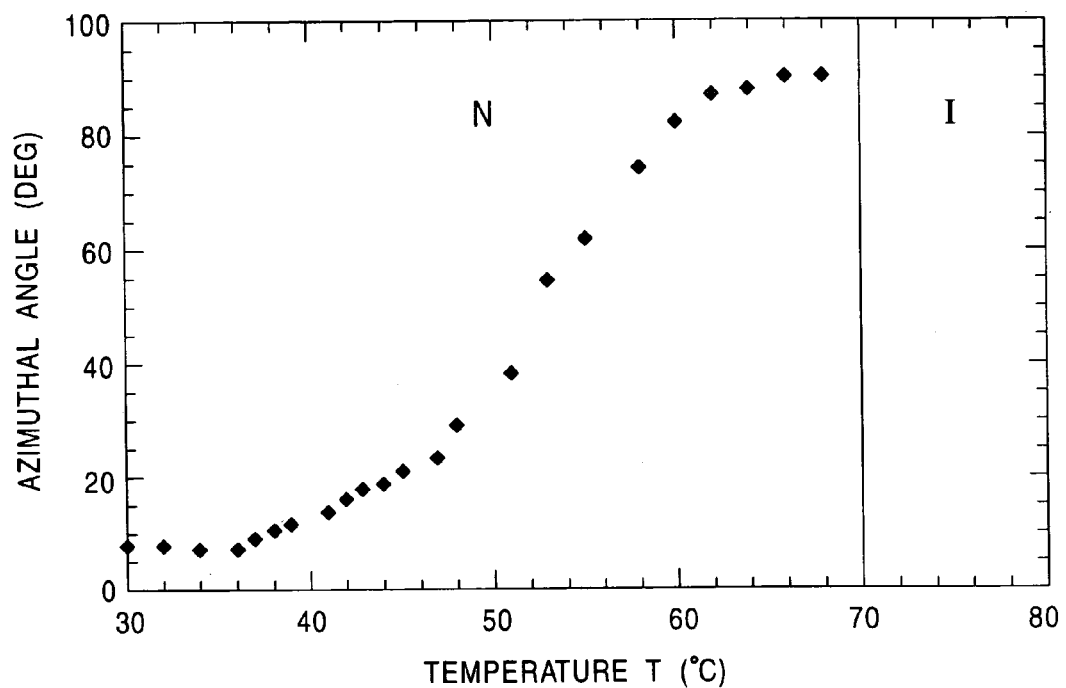
FIG. 3 is a view showing the temperature dependence of an azimuthal angle φ according to the present invention.

FIG. 3 shows the temperature-dependence of the azimuthal angle φ according to the present invention, in which the vertical axis represents the azimuthal angle and the horizontal axis represents the temperature. The results are very similar to those disclosed in the above-mentioned literature (15). Before being illuminated with light, the temperature of the sample is set to 36° C. which is just below the temperature at which the temperature-induced change of the optical anisotropic axis occurs. For a very short period of time, such as one second or less, the sample is illuminated with excitation light which passed through a stop. It is found that optical anisotropic axis of a part of the sample illuminated with the light shifted to the X axis [FIG. 2(b)].

Figure 4:
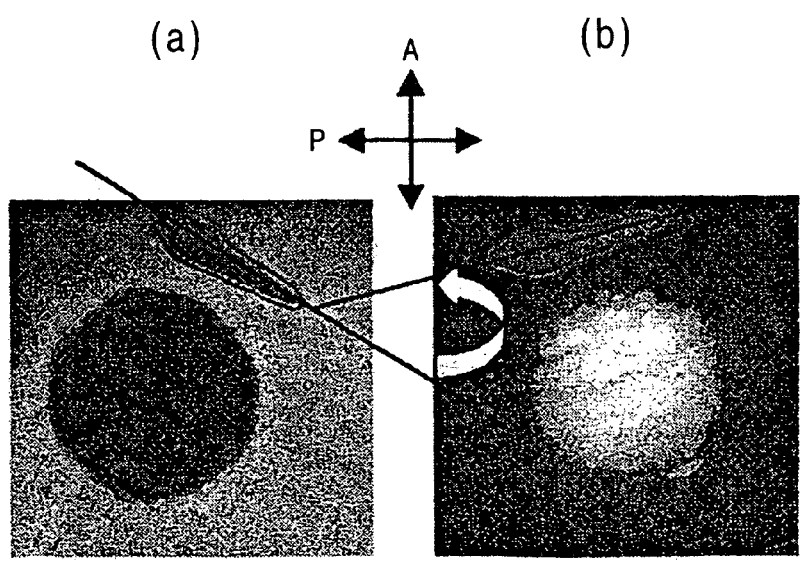
FIG. 4 includes views showing photographs in which a sample illuminated with light according to the present invention was observed at two different positions by the use of crossed nicols.

The sample illuminated with the light was placed at two different positions and was observed with crossed nicols, and the photographs thereof are shown in FIG. 4.

FIG. 4 are photographs of dichroic nematic liquid crystal which is placed in the twofold degenerate anchoring condition by the $SiO_x$ thin film, and this photograph was taken after the sample was illuminated with light having a wavelength λ of 510 to 560 nm for one second or less while the temperature thereof was set to 36° C. The central region of the photograph is the illuminated position, and the two photographs show the different places which were observed with crossed nicols. FIG. 4(a) shows the case in which the optical axis in the illuminated region is located at the transmission position of one of the polarizers, and FIG. 4(b) shows the case in which the sample was rotated in the clockwise direction as indicated by the arrow so that the optical axis in the unilluminated region is located at the transmission position of the polarizer.

As can be seen, the deviation of the optical axis is approximately 50°. A small alignment defect domain in the unilluminated region is used as a marker for recording the sample position.

The two different positions indicate the illuminated part in the cell and the unilluminated part therein. From these two photographs, it is understood that the photoinduced rotation of the anisotropic axis in the planar (in-plane) direction is approximately 50°. By a longer exposure time of approximately two seconds, the change of the anisotropic axis is approximately 80°.

In order to understand the origin of the photoinduced in-plane rotation of the optical anisotropic axis, it is necessary to recall the temperature-induced anchoring transition of nematic liquid crystal caused by the twofold degenerate anchoring [refer above-mentioned literatures (15) and (18)]

and the photoinduced anchoring transition of photodichroic nematic [refer above-mentioned literatures (4) to (6), and (9)].

According to the theoretical model of the temperature-induced alignment transition in the case of the twofold degeneracy [refer above-mentioned literature (12)], the scalar order parameters at which the polar tilt angle θ vanishes and at which the azimuthal angle φ becomes 90° are $S_\theta$ and $S_\phi$, that is, $S_\theta = S(T_\theta)$ and $S_\phi = S(T_\phi)$ are satisfied, respectively. The values obtained by fitting the experimental data to the theoretical model are such that $S_\theta = 0.378$ and $S_\phi = 0.389$ are satisfied, that is, $S_\theta < S_\phi$ is satisfied. Both $S_\theta$ and $S_\phi$ are larger than the scalar order parameter at an N-I phase transition point [refer above-mentioned literature (12)].

The theoretical model predicts that two second-order transitions occur at $T_\theta$ and $T_\phi$, which are equal to or less than $T_{NI}$. Accordingly, in the case of the twofold degenerate anchoring, by the coupling between θ and φ, when the sample temperature is increased, a quasi-in-plane (in-plane) reorientation of the alignment direction of the liquid crystal will occur.

Next, dichroic nematic liquid crystal in a cell whose inner surfaces are coated with $SiO_x$ thin films will then be discussed (as has been well known, the surface of the $SiO_x$ thin film is hydrophilic).

In general, during the trans-cis isomerization process, it is believed that both the shape and the magnitude of a molecular dipole moment are changed. In the case of the present invention, the molecular shape of 4-hexyloxy-(4'-hexyl) azobenzene changes from linear to bent, as shown in FIG. 5. In addition, the magnitude of the molecular dipole moment increases during the photoisomerization process from 0.5D (debye) for the trans-isomer to 3.5D for the cis-isomer.

Figure 6:
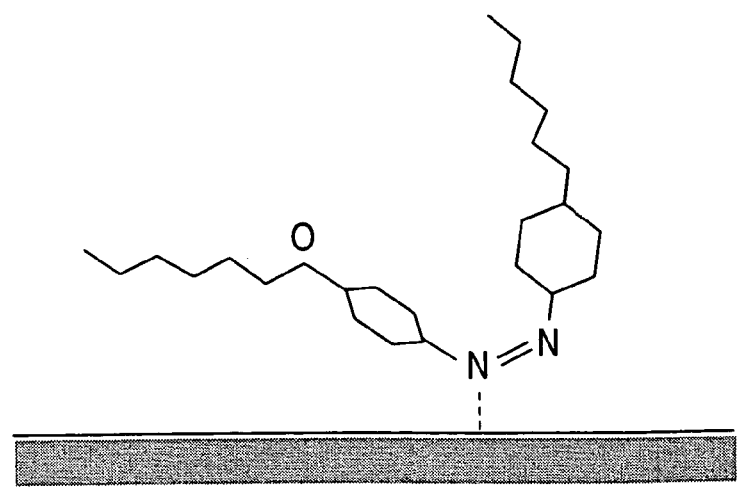
FIG. 6 is a schematic view showing the state in which a cis-isomer according to the present invention is fixed to a solid surface.

Through studies carried by the inventors of the present invention on the formation of LB (Langmuir-Blodgett) monolayers of azobenzene derivatives on a water surface, it has been understood that 4-hexyloxy-(4'-hexyl)azobenzene acts as a molecule having polarity. Accordingly, due to the higher polarity, it is believed that, as shown in FIG. 6, the cis-isomer is very likely to be adsorbed on the hydrophilic $SiO_x$ surface.

However, the presence of the cis-isomers will not only affect the surface phenomenon but will also simultaneously influence the anchoring of the liquid crystal to the surface. Most probably, due to the presence of the cis-isomers, the order parameters $S_\theta$ and $S_\phi$ of the liquid crystal at the surface are reduced. Accordingly, the transition temperatures $T_\theta$ and $T_\phi$ are decreased. As a result, in the liquid crystal cell in the twofold degenerate anchoring condition, in-plane reorientation of the alignment occurs by illumination. That is, in other words, photoinduced reorientation of the alignment occurs at a temperature lower than that expected from the transition temperature of the temperature-induced anchoring transition.

To estimate the influence of the heating effect by excitation light, the sample temperature was set to a temperature close to the clearing point $T_{NI}$ and then the sample was illuminated with light for five seconds. A very small change (1° C. or less) in transition temperature $T_{NI}$ was observed. From the result thus obtained, it is believed that the photoinduced reorientation of the alignment caused by the heating effect of the excitation light is small enough to be ignored.

To control the alignment direction of the liquid crystal by light is of great interest in view of photonics. In particular, fast in-plane switching of the optical anisotropic axis of nematic liquid crystal by light is very important in view of applications of all optical switches, optical modulators, and the like.

According to the present invention, it becomes clear that fast in-plane switching can be performed by photoinduction of the optical anisotropic axis of dichroic nematic liquid crystal. In particular, the change of the optical anisotropic axis by light is very large, such as approximately 80°, and the speed is very fast, such as two seconds. However, according to design of dichroic liquid crystal, faster swiching may be achived in future. Furthermore, by appropriately selecting the depositon conditions for $SiO_x$, it is believed that the photoinduced transition could be 90°. As described above, in addition to liquid crystal devices operated based on the amplitude modulation, large change in direction of the anisotropic axis is of great interest to devcies operated based on the ligth phase modulation.

In addition, the present invention is not limited to the examples described above, and any modifications may be made without departing from the scope of the present invention and are not excluded therefrom.

As has thus been described, according to the present invention, fast in-plane switching can be performed by photoinduction of the optical anisotropic axis of dichroic nematic liquid crystal. In particular, the switching time is extremely short, such as approximately two seconds. By the design of dichroic liquid crystal, faster switching may be achieved in future. Furthermore, by selecting appropriate deposition conditions for $SiO_x$, it is believed that the photoinduced phase transition could be 90°.

INDUSTRIAL APPLICABILITY

In addition to liquid crystal displays, the photoinduced switching liquid crystal device according to the present invention can be applied to the entire applied photo-techniques including optical communication, optical memories, and the like.

The invention claimed is:

1. A photoinduced switching liquid crystal device comprising:
   a cell having substrates separated by a space and including a liquid crystal in the space, the substrates having an alignment layer formed thereon, respectively,
   wherein the liquid crystal comprises a dichroic nematic liquid crystal having an azobenzene group, the alignment layer comprises obliquely deposited silicon oxide, and a twofold degenerate in-plane switching phenomenon, which is caused by competition of anchoring forces on the alignment layer, is combined with an anchoring transition phenomenon, which is caused by a photoisomerization of liquid crystal molecules having an azobenzene group, thereby realizing in-plane switching of an optical anisotropic axis of the dichroic nematic liquid crystal.

2. The photoinduced switching liquid crystal device according to claim 1, wherein the diebroic nematic liquid crystal produces an approximately 80 to 90° change of the optical anisotropic axis by photoinduction.

3. The photoinduced switching liquid crystal device according to claim 1, wherein the dichroic nematic liquid crystal produces the in-plane switching on a time scale of seconds.

4. A photoinduced switching liquid crystal device comprising:
   a first substrate;
   a second substrate separated from the first substrate by a space; and
   a liquid crystal provided in the space,
   wherein the liquid crystal is dichroic nematic liquid crystal, the first and second substrates have alignment layers comprising obliquely deposited silicon oxide, respectively, and the dichroic nematic liquid crystal comprises a photoisomerizable material capable of transforming between first and second states having different electron dipole moments and producing a photoinduced anchoring transition and a twofold degenerate in-plane switching phenomenon, which is caused by competition of anchoring forces on the alignment layers, is combined with an anchoring transition phenomenon, which is caused by photoisomerization of liquid crystal molecules having an azobenzene group, thereby realizing in-plane switching of an optical anisotropic axis of the photoisomerizable material.

5. The photoinduced switching liquid crystal device according to claim 4, wherein the photoisomerizable material has an azobenzene group.

6. The photoinduced switching liquid crystal device according to claim 4, wherein the photoisomerizable material comprises 4-hexyloxy-(4'-hexyl)azobenzene.

* * * * *